(12) United States Patent
Juni

(10) Patent No.: US 8,325,157 B2
(45) Date of Patent: Dec. 4, 2012

(54) OPTICAL COORDINATE INPUT APPARATUS

(75) Inventor: Noriyuki Juni, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 552 days.

(21) Appl. No.: 12/638,536

(22) Filed: Dec. 15, 2009

(65) Prior Publication Data

US 2010/0182280 A1    Jul. 22, 2010

(30) Foreign Application Priority Data

Jan. 20, 2009  (JP) ................................. 2009-009534

(51) Int. Cl.
*G06F 3/042*    (2006.01)
(52) U.S. Cl. ...................................................... 345/175
(58) Field of Classification Search .................... 345/175
See application file for complete search history.

(56) References Cited

U.S. PATENT DOCUMENTS

| | | | | |
|---|---|---|---|---|
| 4,742,221 A | * | 5/1988 | Sasaki et al. | 250/221 |
| 4,771,170 A | * | 9/1988 | Hasegawa | 250/221 |
| 8,009,944 B2 | * | 8/2011 | Shimizu | 385/32 |
| 2010/0182279 A1 | * | 7/2010 | Juni | 345/175 |

FOREIGN PATENT DOCUMENTS

JP    2004-295644 A    10/2004

* cited by examiner

*Primary Examiner* — Fred Tzeng
(74) *Attorney, Agent, or Firm* — Westerman, Hattori, Daniels & Adrian, LLP

(57) ABSTRACT

In an optical coordinate input apparatus, beams emitted from one light emitting element are simultaneously guided through a plurality of cores provided at a waveguide to edges on Y-side and X-side of light emitting sides of an operational area, a light receiving element group includes light receiving elements corresponding respectively to cores aligned on Y-side of light receiving sides and light receiving elements corresponding respectively to cores aligned on X-side of the light receiving sides of the operational area, a scan is performed on each of the light receiving elements sequentially so as to detect presence or absence of a light shielding signal, and a scan time for the scan of all the light receiving elements included in the light receiving element group is set to be not more than 1 ms.

5 Claims, 6 Drawing Sheets

OPTICAL COORDINATE INPUT APPARATUS

CROSS-REFERENCE TO RELATED APPLICATIONS

This application claims priority from Japanese Patent Application No. 2009-009534, filed on Jan. 20, 2009, the contents of which are hereby incorporated by reference.

BACKGROUND OF THE INVENTION

1. Field of the Invention

The present invention relates to an optical coordinate input apparatus. In particular, the invention relates to an optical coordinate input apparatus in which a plurality of light emitting devices are arranged on one side of two sides opposite in horizontal direction (opposite in X direction) of a rectangular operational area in a display device while a plurality of light receiving devices are arranged on the other side thereof so that each of the plurality of light receiving devices faces each of the plurality of light emitting devices, and at the same time, a plurality of light emitting devices are arranged on one side of two sides opposite in vertical direction (opposite in Y direction) of the rectangular operational area in the display device while a plurality of light receiving devices are arranged on the other side thereof so that each of the plurality of light receiving devices faces each of the plurality of light emitting devices, wherein beams emitted from the plurality of light emitting devices are arranged in X-Y matrix inside the operational area, and wherein, when a light shielding signal is detected through a light receiving devices in X direction and also through a light receiving devices in Y direction, the optical coordinate input apparatus determines that the display device is touched at an intersection of a line from the light receiving devices in X direction and a line from the light receiving devices in Y direction, and inputs the coordinates of the intersection.

2. Description of Related Art

There have been conventionally proposed various types of coordinate input devices which are disposed on display devices such as a liquid crystal display and detect positions touched on the display devices with fingers and the like. The types of the coordinate input devices include a resistive-film type, a surface acoustic wave type, an optical (infrared light) type, an electromagnetic induction type, an electrostatic capacitance type and the like. Among them, an optical-type coordinate input device has been widely employed in, for instance, an automatic teller machine in a bank, a ticket vending machine in a railroad station, etc. since the optical-type coordinate input device has high light transmission property and also has excellent transparency and reliability.

The optical coordinate input apparatus of this kind as described in Japanese Laid-open Patent Application No. 2004-295644 is generally configured to dispose plural sets of light emitting diodes on one horizontal side of a rectangular operational area defined in a display device and on one vertical side thereof respectively, and also to dispose a plurality of phototransistors on the other horizontal side of the operational area and on the other vertical side thereof so that the plurality of phototransistors are spaced from and facing the respective light emitting diodes.

Here, in the conventional optical coordinate input apparatus, the plurality of light emitting diodes disposed on one horizontal side of the rectangular operational area are illuminated, and also the plurality of light emitting diodes disposed on one vertical side thereof are illuminated. As a result, beams emitted from the pluralities of light emitting diodes form an X-Y matrix in the operational area. When a light shielding signal is detected simultaneously at each of a phototransistor disposed in X direction and a phototransistor disposed in Y direction, it is determined that the display device has been touched on an intersection of a line from the phototransistor disposed in X direction and a line from the phototransistor disposed in Y direction.

However, such a conventional optical coordinate input apparatus is originally designed to detect only one touch position in one input operation performed by a finger, a pen, etc. in the rectangular operational area. Accordingly, there is not disclosed or suggested any control with respect to a case where the display device is touched on more than one touch position simultaneously in the rectangular operational area.

Here, in an optical coordinate input apparatus, even when an ordinary operator intends to touch the two points simultaneously, it is practically impossible to touch two points exactly simultaneously. There will occur at least more than 1 ms of time lag between touch timings on the two points, based on ergonomics.

Under these circumstances, in a case where a scan time is more than 1 ms for detecting light shielding signals by sequentially scanning light emitting elements or light receiving elements in the optical coordinate input apparatus, more than one touch position may be detected within one scan time.

Figure 5:
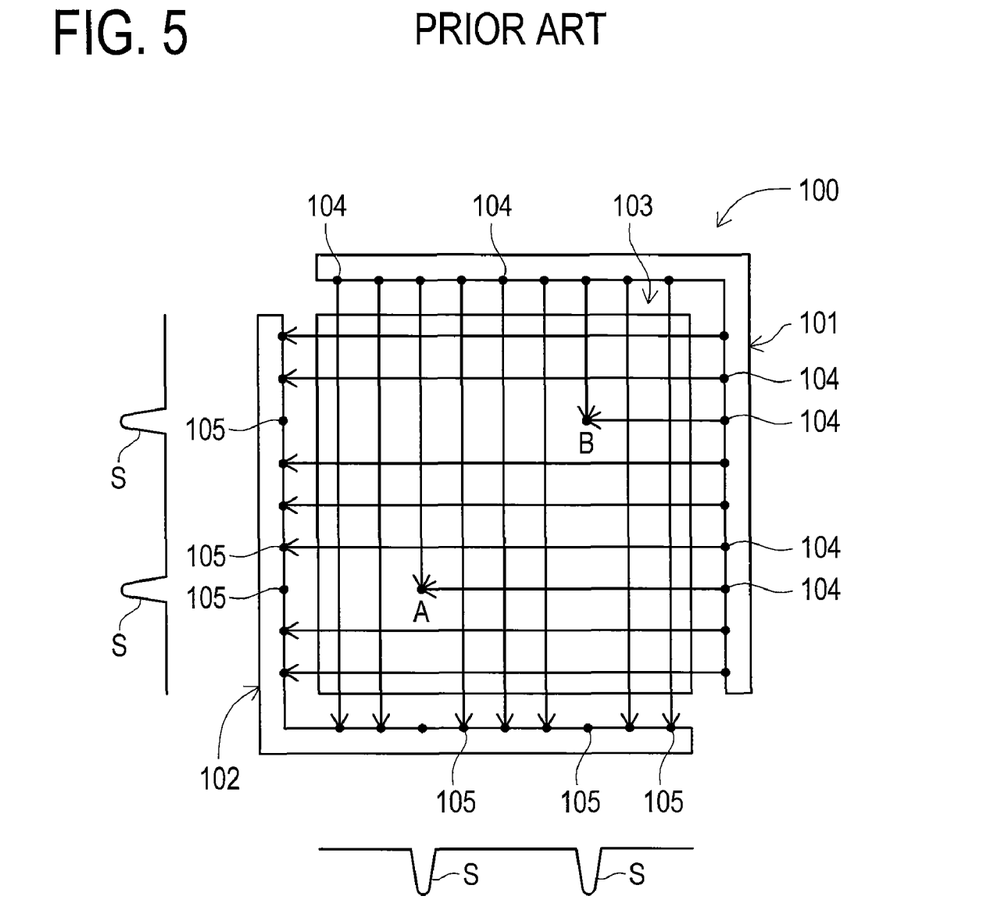
FIG. 5 is an explanatory view in schematic form depicting a case where two touch positions are detected in one scan time in a conventional optical coordinate input apparatus.
Figure 6:
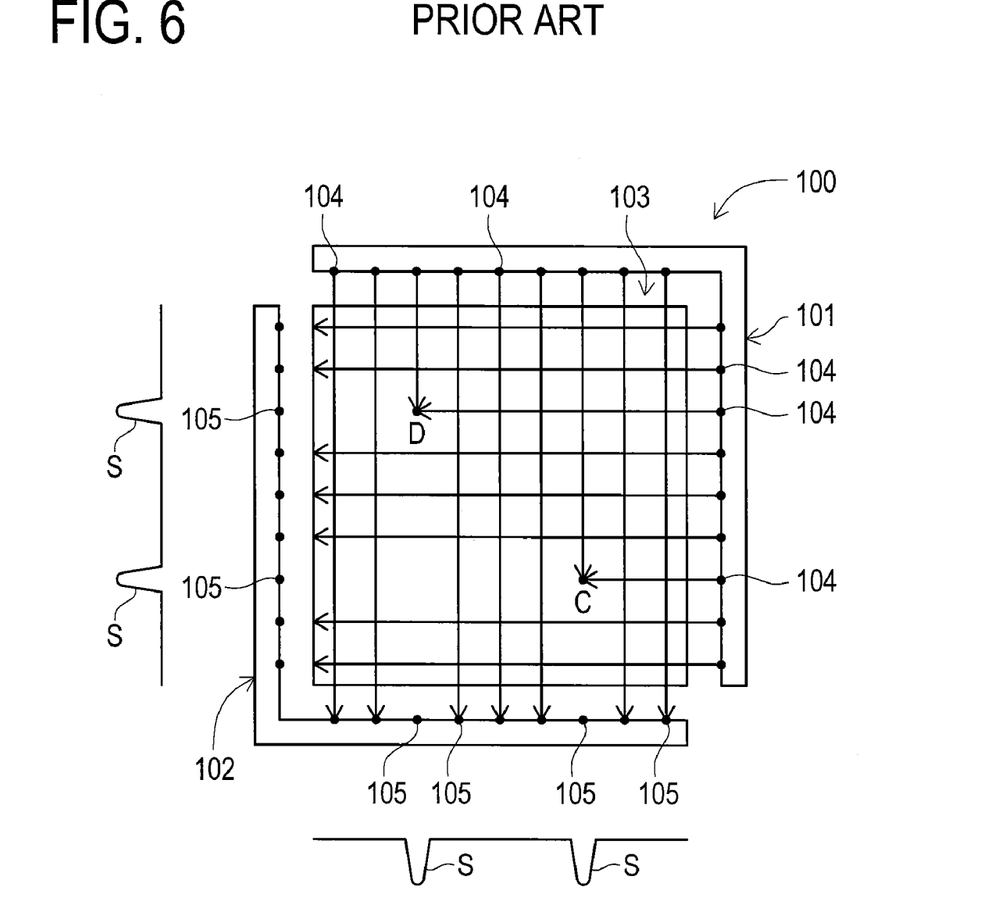
FIG. 6 is an explanatory view in schematic form depicting a case where two touch positions are detected in one scan time in a conventional optical coordinate input apparatus.

Details of the above case will be given referring to FIG. 5 and FIG. 6. FIG. 5 and FIG. 6 are explanatory views each illustrating a frame format when two touch positions are detected within one scan time.

In FIG. 5, an optical coordinate input apparatus 100 has a light emitting unit 101 and a light receiving unit 102 both of which are L-shaped. In an area surrounded by the light emitting unit 101 and the light receiving unit 102, a rectangular operational area 103 is formed. Nine light emitting elements 104 are aligned in vertical direction in a vertical portion (Y-side portion) of the light emitting unit 101, and another nine light emitting elements 104 are aligned in horizontal direction at a horizontal portion (X-side portion) of the light emitting unit 101.

Also, nine light receiving elements 105 are aligned in vertical direction in a vertical portion (Y-side portion) of the light receiving unit 102, and another nine light receiving elements 105 are aligned in horizontal direction at a horizontal portion (X-side portion) of the light receiving unit 102.

In the optical coordinate input apparatus 100, each of the light emitting elements 104 aligned at the vertical portion of the light emitting unit 101 and each of the light receiving elements 105 aligned at the vertical portion of the light receiving unit 102 are placed to face each other. Beams emitted from the light emitting elements 104 are respectively received through the light receiving elements 105. Also, each of the light emitting elements 104 aligned at the horizontal portion of the light emitting unit 101 and each of the light receiving elements 105 aligned at the horizontal portion of the light receiving unit 102 are placed to face each other. Beams emitted from the light emitting elements 104 are respectively received through the light receiving elements 105. As a result, in the operational area 103, beams emitted from the respective light emitting elements 104 form an X-Y matrix, as illustrated in FIG. 5.

Here is a case as illustrated in FIG. 5 where an operator has touched a point A and a point B in this order with two fingers. In this case, the point A is located at an intersection of a beam emitted from the seventh light emitting element 104 downward from the top at the vertical portion of the light emitting unit 101 and a beam emitted from the third light emitting element 104 rightward from the left at the horizontal portion thereof. As each of the above beams is shielded at the intersection, a light shielding signal S is detected at the seventh light receiving element 105 downward from the top at the vertical portion of the light receiving unit 102, and at the same time, a light shielding signal S is detected at the third light receiving element 105 rightward from the left at the horizontal portion thereof. In the similar manner, the point B is located at an intersection of a beam emitted from the third light emitting element 104 downward from the top at the vertical portion of the light emitting unit 101 and a beam emitted from the seventh light emitting element 104 rightward from the left at the horizontal portion thereof. As each of the above beams is shielded at the intersection, a light shielding signal S is detected at the third light receiving element 105 downward from the top at the vertical portion of the light receiving unit 102, and at the same time, a light shielding signal S is detected at the seventh light receiving element 105 rightward from the left at the horizontal portion thereof.

As has been described above, in the optical coordinate input apparatus 100, the time required for one scan is more than 1 ms. As a result, even though the operator has touched the point A and the point B in this order, it is impossible to recognize the order of the touches based on the timings of scanning, when the point A and the point B are detected in one scan time.

Here is a case, as illustrated in FIG. 6, where a quadrangle is assumed to have the point A and the point B as two opposite vertices and a point C and a point D are set as the other two opposite vertices. There, the point C and the point D are touched in this order within one scan time. The point C is located at an intersection of a beam emitted from the seventh light emitting element 104 downward from the top at the vertical portion of the light emitting unit 101 and a beam emitted from the seventh light emitting element 104 rightward from the left at the horizontal portion thereof. As each of the above beams is shielded at the intersection, a light shielding signal S is detected at the seventh light receiving element 105 downward from the top at the vertical portion of the light receiving unit 102, and at the same time, a light shielding signal S is detected at the seventh light receiving element 105 rightward from the left at the horizontal portion thereof. In the similar manner, the point D is located at an intersection of a beam emitted from the third light emitting element 104 downward from the top at the vertical portion of the light emitting unit 101 and a beam emitted from the third light emitting element 104 rightward from the left at the horizontal portion thereof. As each of the above beams is shielded at the intersection, a light shielding signal S is detected at the third light receiving element 105 downward from the top at the vertical portion of the light receiving unit 102, and at the same time, a light shielding signal S is detected at the third light receiving element 105 rightward from the left at the horizontal portion thereof.

Here, the result of the light shielding signals S obtained in the case of FIG. 5 and the result of the light shielding signals S obtained in the case of FIG. 6 are completely identical. Considering these results, even when the point A and the point B are touched as illustrated in FIG. 5, the point C and the point D may be recognized to be touched as illustrated in FIG. 6, and vice versa.

SUMMARY OF THE INVENTION

With the recent progress of optical coordinate detection apparatuses, there is not much versatility in an optical coordinate detection apparatus in which only one touch position can be detected. There has been desired an optical coordinate input apparatus that, even in a case where two points are simultaneously touched on a display thereof, can accurately detect the positions touched in accordance with the order of the touches.

The present invention has been made to overcome the above problems and the object thereof is to provide a novel optical coordinate input apparatus. In the optical coordinate input apparatus of the present invention, a plurality of light emitting devices are arranged on one of two opposite sides and a plurality of light receiving devices are arranged on the other one of the two opposite sides of a rectangular operational area, and, a scan time for scanning the plurality of light receiving devices is set to be not more than 1 ms when each of the plurality of light receiving devices is simultaneously illuminated and sequentially scanned in order to detect the presence or absence of light shielding signals. Accordingly, in the optical coordinate input apparatus of the present invention, even in a case where two points in the operational area are touched approximately simultaneously, the order and positions of the two points touched can be accurately detected.

To achieve the above object of the disclosure, there is provided an optical coordinate input apparatus having a light emitting part including a plurality of first light emitting devices arranged along a first side defining a part of a rectangular operational area on a display device, and a plurality of second light emitting devices arranged along a second side perpendicular to the first side, a light receiving part including a plurality of first light receiving devices for receiving light emitted from each of the first light emitting devices, each of the first light receiving devices being arranged so as to be opposed to each of the first light emitting devices and arranged along a third side opposed to the first side, and a plurality of second light receiving devices for receiving light emitted from each of the second light emitting devices, each of the second light receiving devices being arranged so as to be opposed to each of the second light emitting devices and arranged along a fourth side opposed to the second side, wherein when light shielding signals are detected by a first light receiving device and a second light receiving device, the optical coordinate input apparatus judges that the display device is touched in the rectangular operational area at an intersection point where light emitted from the a first light emitting device corresponding to the first light receiving device and light emitted from a second light emitting device corresponding to the second light receiving device mutually intersect, the optical coordinate input apparatus further comprising a light emitting control device for controlling both the first light emitting devices and the second light emitting devices so as to emit light at the same time; and a detection control device for detecting the light shielding signal by sequentially scanning each of the first light receiving devices and the second light receiving devices, wherein a scanning time to scan all of the first light receiving devices and the second light receiving devices by the detection control device is set not more than 1 ms.

In the optical coordinate input apparatus 1 having the above features, the plurality of first light emitting devices and the plurality of second light emitting devices are simultaneously illuminated through the light emitting control devices, while the plurality of first light receiving devices and the plurality of second light receiving devices are sequentially scanned through the detection control device in order to detect presence or absence of a light shielding signal. When detecting presence or absence of a light shielding signal, the scan time for scanning the plurality of first and second light receiving devices is set to be 1 ms or less. Thus, the plurality of first and the second light receiving devices can be scanned in a time period shorter than the time lag which occurs between two touches of an ordinary operator who touches two points with an intention of touching the two points simultaneously. Accordingly, even in the case where two points in the operational area are touched approximately simultaneously, the order and positions of the two points touched can be accurately detected.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE PREFERRED EMBODIMENTS

A detailed description of an exemplary embodiment of an optical coordinate input apparatus embodying the present invention will now be given referring to the accompanying drawings.

Figure 1:
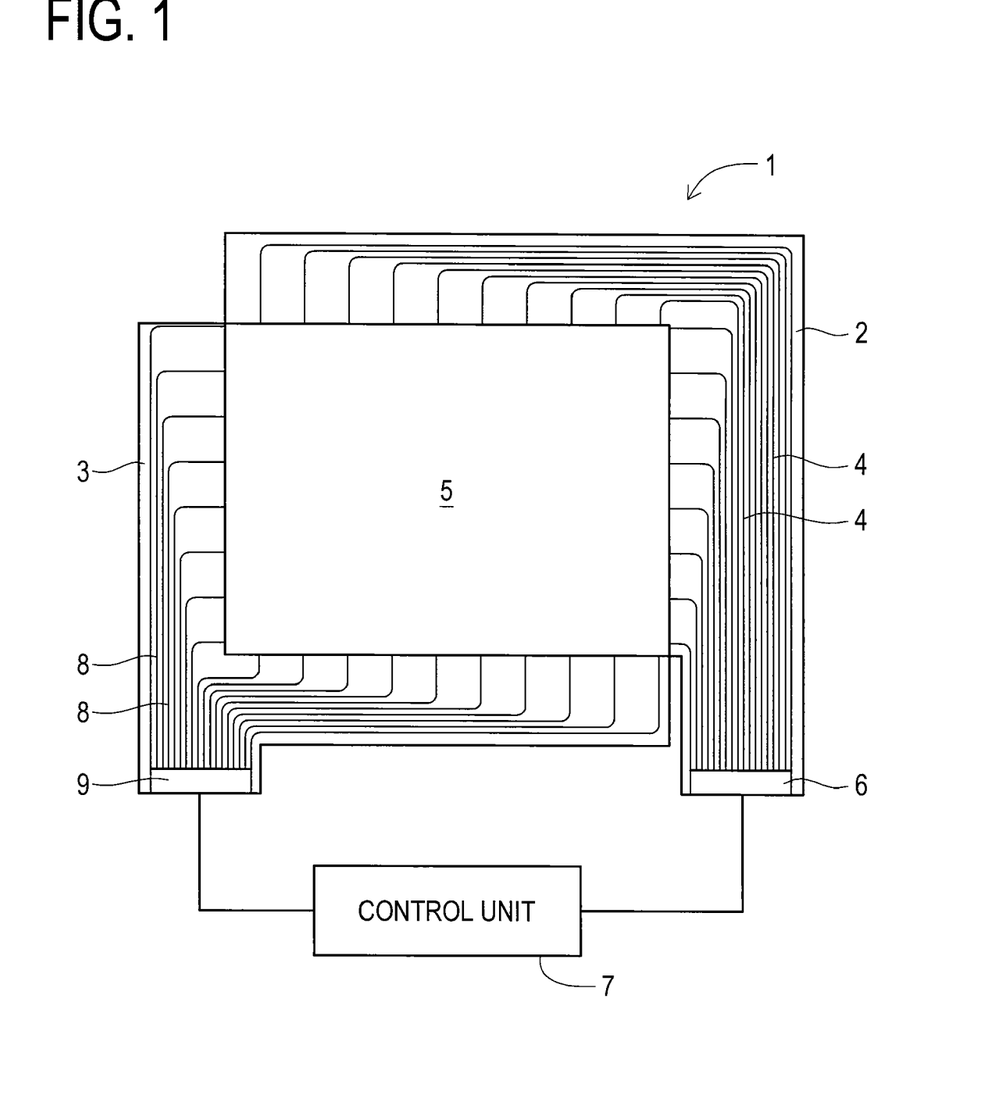
FIG. 1 is a plan view in schematic form depicting an optical coordinate input apparatus in a present embodiment.

First, a description of the schematic configuration of an optical coordinate input apparatus according to the present embodiment will be given according to FIG. 1. FIG. 1 is a plan view in schematic form depicting the optical coordinate input apparatus.

The optical coordinate input apparatus 1 is used through being installed in various kinds of displays such as a liquid crystal display. The optical coordinate input apparatus 1 is provided with two waveguides 2 and 3 as illustrated in FIG. 1. The waveguide 2 is formed in L-shape with eighteen cores (light guide members) 4 included therein. Eight cores 4 (eight cores 4 on the left at converged end portions illustrated in FIG. 1) of the eighteen cores 4 are guided to an edge on the right side of a rectangular operational area 5. The remaining ten cores 4 (ten cores 4 on the right at the converged end portions illustrated in FIG. 1) are guided to an edge on the upper side of the rectangular operational area 5.

At the waveguide 2, one light emitting element 6 such as LED is provided at the end portion where the cores 4 converge. The light emitting element 6 is connected to a control unit 7. Through the control unit 7, a control over the light emitting element 6 is performed. Here, when the light emitting element 6 is illuminated through the control unit 7, beams from the light emitting element 6 are guided through respective cores 4 to the edge on the right side (Y-side of the light emitting sides) and the edge on the upper side (X-side of the light emitting sides) of the rectangular operational area 5. Thus, beams are emitted from respective end faces of the cores 4.

The waveguide 3 is, similar to the waveguide 2, formed in L-shape with eighteen cores 8 included therein. Eight cores 8 (eight cores 8 on the left at end portions illustrated in FIG. 1) of the eighteen cores 8 are guided to an edge on the left side (Y-side of the light receiving sides) of the rectangular operational area 5. The remaining ten cores 8 (ten cores 8 on the right at the end portions illustrated in FIG. 1) are guided to an edge on the lower side (X-side of the light receiving sides) of the rectangular operational area 5.

At the waveguide 3, a light receiving element group 9 is provided at the end portion where the cores 8 converge. The light receiving element group 9 has a plurality of light receiving elements each corresponding to each of the cores 8. The light receiving element group 9 is configured with, for instance, CMOS image sensors or CCD image sensors. The light receiving element group 9 is connected to the control unit 7. Through the control unit 7, a scan control and a light receiving detection control are performed over the plurality of light receiving elements in the light receiving element group 9.

Here, end faces of the cores 8 aligned at the edge on Y-side of the light receiving sides are arranged so as to be respectively assigned to the end faces of the cores 4 aligned at the edge on the Y-side of the light emitting sides. Each of the end faces of the cores 8 receives a beam emitted from each of the end faces of the cores 4. The beams thus received are then received by the respective light receiving elements in the light receiving element group 9 through the respective cores 8. Also, end faces of the cores 8 aligned at the edge on X-side of the light receiving sides are arranged so as to be respectively assigned to the end faces of the cores 4 aligned at the edge on the X-side of the light emitting sides. Each of the end faces of the cores 8 receives a beam emitted from each of the end faces of the cores 4. The beams thus received are transmitted through the respective cores 8 and then received by the respective light receiving elements in the light receiving element group 9.

Here, the control unit 7 scans all the light receiving elements in the light receiving element group 9 to detect the presence or absence of light shielding signals. A scan time for the above detection is set to be 1 ms or less, taking into consideration the time lag of at least 1 ms which occurs between two touches when an ordinary operator touches two points with an intention of touching the two points simultaneously. The scan time may preferably be set to not more than 0.2 ms.

The waveguides 2 and 3 are configured in a similar manner to respective waveguides disclosed in Japanese Patent Application Laid-open No. 2008-203431. Accordingly, details of the waveguides 2 and 3 will not be given here.

Next, a description will be given, according to FIGS. 2A to 2D, with respect to how an operator inputs coordinates using two of his/her fingers in the operational area 5 of the optical coordinate input apparatus 1 which is configured as the above. FIGS. 2A to 2D are explanatory views in continuous and schematic form depicting how the operator inputs the coordinates using two of his/her fingers from a non-contact state.

Figure 2A:
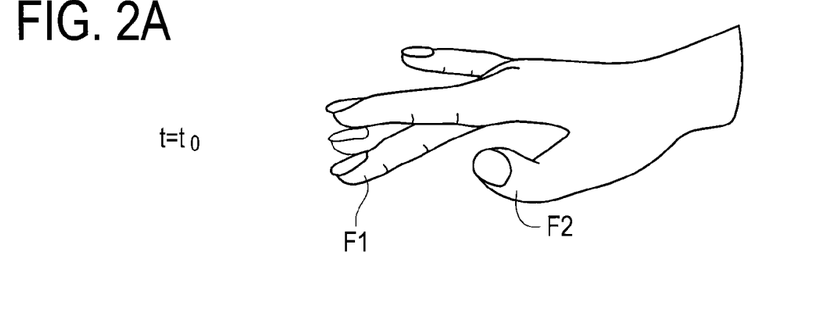
FIGS. 2A to 2D are explanatory views in continuous and schematic form depicting how an operator inputs coordinates using two fingers starting from a non-contact state.
Figure 2B:
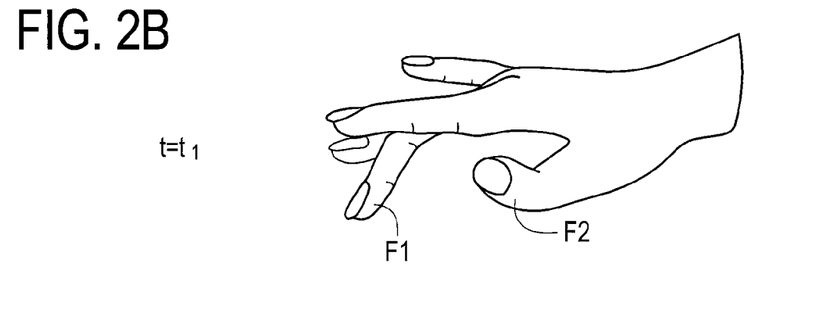

FIG. 2A depicts the non-contact state, where each light receiving element in the light receiving element group 9 is being scanned sequentially, and where the operator has not at all touched the operational area 5 in the optical coordinate input apparatus 1 at time t=t0. Then, at time t=t1 as illustrated in FIG. 2B, during a scan time at a first scan timing, the operational area 5 is touched with a middle finger F1. Here, the operational area 5 has not yet touched with any finger other than the middle finger F1.

Figure 2C:
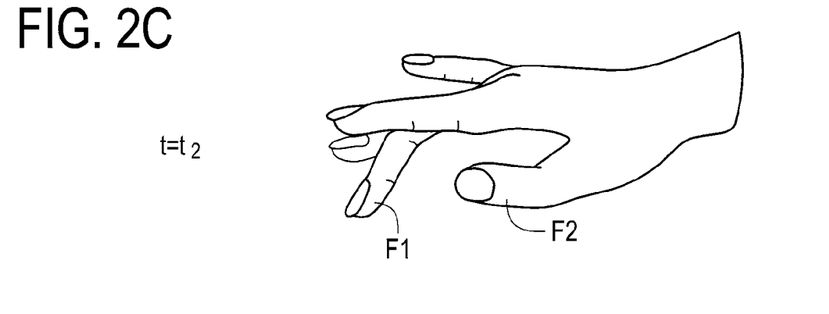
Figure 2D:
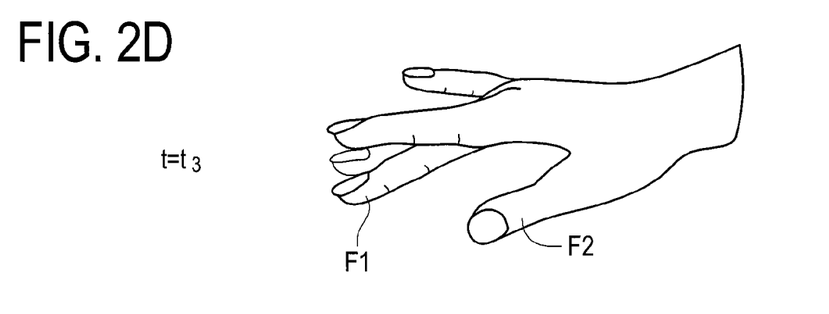

Further, at time t=t2 as illustrated in FIG. 2C, during a scan time at a second scan timing which follows the first scan timing, while the state where the operational area 5 is touched with the middle finger F1 is maintained, the operational area 5 is beginning to be touched further with a thumb F2. Then the operational area 5 is touched simultaneously with the middle finger F1 and with the thumb F2 at time t=t3 as illustrated in FIG. 2D, during a scan time at a third scan timing which follows the second scan timing.

Figure 3:
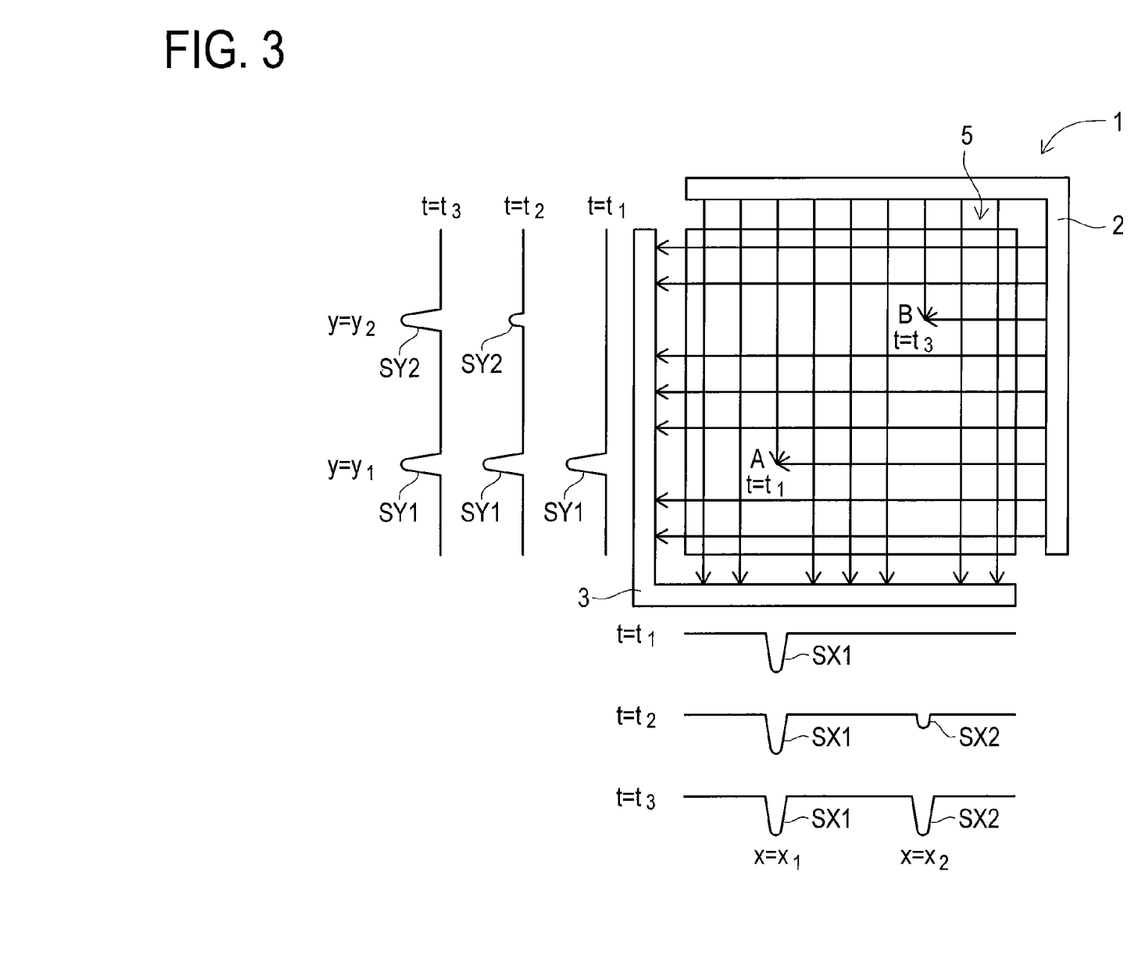
FIG. 3 is an explanatory view in schematic form depicting a relation between touch timings and light shielding signals.

Next, a description will be given, according to FIG. 3, on a relation between touch timings and light shielding signals detected through the respective light receiving elements in the light receiving element group 9 in a case where a touch operation is performed in the operational area 5 of the optical coordinate input apparatus 1 as above illustrated in FIGS. 2A to 2D. FIG. 3 is an explanatory view in schematic form depicting the relation between touch timings and light shielding signals.

At an operation of the optical coordinate input apparatus 1, the light emitting element 6 is firstly turned on through the control unit 7. Upon this, beams from the light emitting element 6 are guided through the respective cores 4. Then, beams are emitted from the end faces of the cores 4 which are aligned along the edge on the Y-side of the light emitting sides of the operational area 5, and at the same time, beams are emitted from the end faces of the cores 4 which are aligned along the edge on the X-side of the light emitting sides of the operational area 5. Accordingly, in the operational area 5, the beams emitted from the end faces of the respective cores 4 form an X-Y matrix.

Here, the control unit 7 is provided with a flag memory having flag regions each of which corresponds to each of the intersections of the beams forming the X-Y matrix. Each of the flag regions stores whether or not a corresponding intersection is touched as on/off of a flag. For instance, if an intersection is touched, a flag is turned on in a flag region corresponding to the intersection, and the flag region becomes a flag-on state. Meanwhile, if the touched-state of the intersection is released, the flag region becomes a flag-off state.

Also, the beams emitted from the respective cores 4 are incident on the end faces of the respective cores 8 which are aligned along the Y-side of the light receiving sides, and at the same time, are incident on the end faces of the respective cores 8 which are aligned along the X-side of the light receiving sides. In this state, the beams guided through the respective cores 8 are received by the respective light receiving elements in the light receiving element group 9, and each of the light receiving elements is in an on-state.

In this state, a scan of the respective light receiving elements in the light receiving element group 9 is performed in a scan time of not more than 1 ms.

Here will be explained a scan operation. First, it is determined whether a light shielding signal is detected at any of the light receiving elements corresponding to the respective cores 8, in a sequential way through the cores 8 aligned along the Y-side of the light receiving sides, from the uppermost core 8 to the lower cores 8 in FIG. 3. Then, upon detecting a light shielding signal through a light receiving element corresponding to a core 8, with reference to the light receiving element, there starts to be determined whether a light shielding signal is detected at any of the light receiving elements corresponding to the respective cores 8 in a sequential way through the cores 8 aligned along the X-side of the light receiving sides in FIG. 3, from the leftmost core 8 to the right side cores 8.

There, to begin with, a point A is touched with the middle finger F1 at time t=t1 during the scan time of the first scan timing. In this state, a light shielding signal SY1 is detected at a light receiving element corresponding to the seventh core 8 from the top of the cores 8 on the Y-side of the light receiving sides. That is, if the coordinates of the point A in the operational area 5 are (x1, y1), the light shielding signal SY1 is detected at y=y1.

Then, with reference to the light receiving element corresponding to the seventh core 8 from the top of the cores 8 on the Y-side of the light receiving sides, a scan is performed through the light receiving elements corresponding to the respective cores 8 on the X-side of the light receiving sides. There, a light shielding signal SX1 is detected at a light receiving element corresponding to the third core 8 from the left. That is, the light shielding signal SX1 is detected at x=x1, which is the X-coordinate of the point A.

Based on the light shielding signals SY1 and SX1 thus detected, it is recognized that the operational area 5 is touched on the point A (x1, y1). According to this, a flag is turned on in a flag region of the flag memory corresponding to the point A, and the flag region is turned to a flag-on state.

Secondly, while the touched-state on the point A with the middle finger F1 is maintained, a touch with the thumb F2 is started on a point B, at time t=t2 during the scan time of the second scan timing. In this state, a light shielding signal SY2 starts to be detected at a light receiving element corresponding to the third core 8 from the top of the cores 8 on the Y-side of the light receiving sides. That is, if the coordinates of the point B in the operational area 5 are (x2, y2), the light shielding signal SY2 starts to be detected at y=y2.

Then, with reference to the light receiving element corresponding to the third core 8 from the top of the cores 8 on the Y-side of the light receiving sides, a scan is performed through the light receiving elements corresponding to the respective cores 8 on the X-side of the light receiving sides. There, a light shielding signal SX2 starts to be detected at a light receiving element corresponding to the seventh core 8 from the left. That is, the light shielding signal SX2 starts to be detected at x=x2, which is the X-coordinate of the point B.

Then, while the touch on the point A with the middle finger F1 is maintained, the touch with the thumb F2 is completed on the point B, at time t=t3 during the scan time of the third scan timing.

In this state, the light shielding signal SY2 is completely detected at y=y2, and the light shielding signal SX2 is completely detected at x=x2.

Based on the light shielding signals SY2 and SX2 thus detected, it is recognized that the operational area 5 is touched on the point B (x2, y2). According to this, a flag is turned on in a flag region of the flag memory corresponding to the point B, and the flag region is turned to a flag-on state.

Here, as above mentioned, with respect to the point A, the flag region corresponding to the point A has been turned to the flag-on state through recognizing the touch on the point A at the scan timing of time t=t1. According to this, when recognizing the touch on the point B at the scan timing of time t=t3, it can be detected that the point A has been touched at a scan timing before time t=t3 by confirming that the flag region corresponding to the point A is in the flag-on state.

Figure 4:
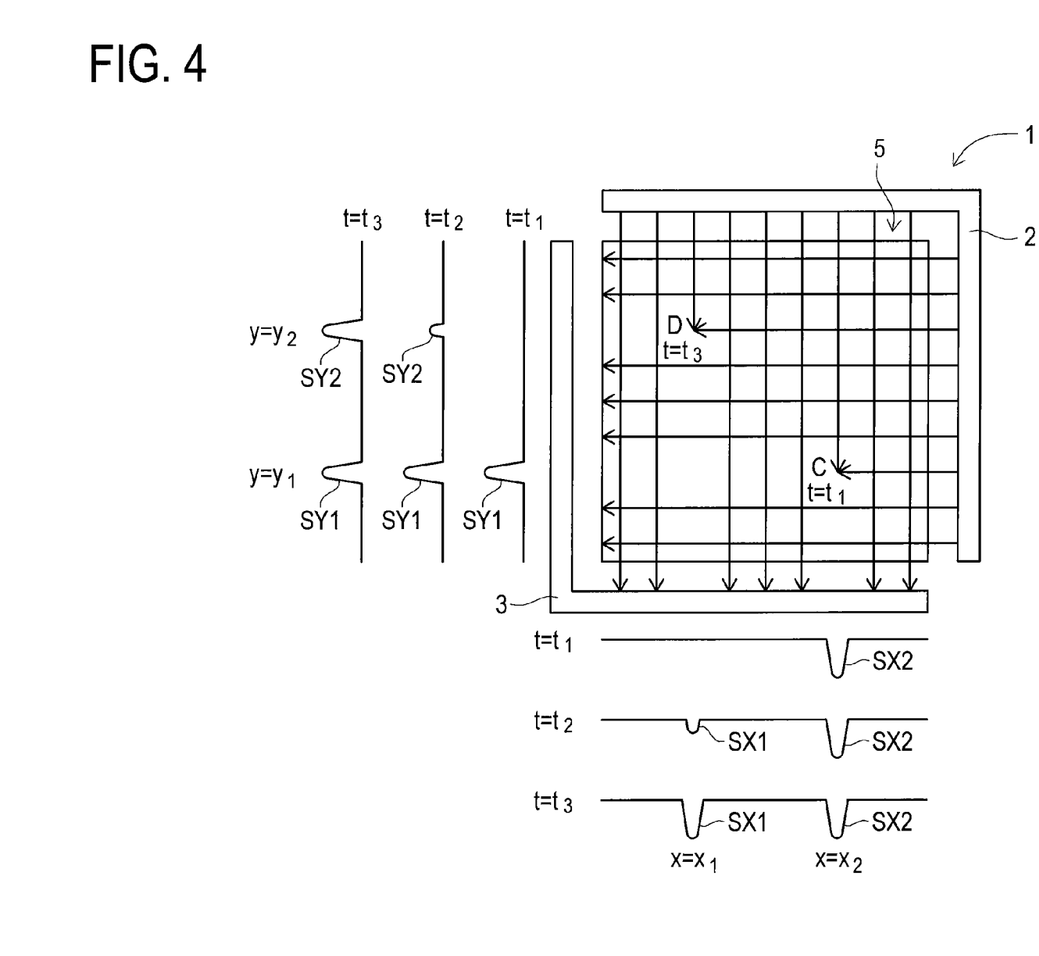
FIG. 4 is an explanatory view in schematic form depicting a relation between touch timings and light shielding signals.

Next, when a quadrangle is assumed to have the point A and the point B as two opposite vertices, a point C and a point D are set as the other two opposite vertices. Here, a description will be given on a relation between touch timings and light shielding signals which are detected through the light receiving elements in the light receiving element group 9 in a case the point C and the point D are touched in this order, referring to FIG. 4, similar to the case in FIG. 3. FIG. 4 is an explanatory view in schematic form depicting the relation between the touch timings and the light shielding signals.

At an operation of the optical coordinate input apparatus 1, the light emitting element 6 is firstly turned on through the control unit 7. Upon this, beams from the light emitting element 6 are guided through the respective cores 4. Then, beams are emitted from the end faces of the cores 4 which are aligned along the edge on the Y-side of the light emitting sides of the operational area 5, and at the same time, beams are emitted from the end faces of the cores 4 which are aligned along the edge on the X-side of the light emitting sides of the operational area 5. Accordingly, in the operational area 5, the beams emitted from the end faces of the respective cores 4 form an X-Y matrix.

Also, the beams emitted from the respective cores 4 are incident on the end faces of the respective cores 8 which are aligned along the Y-side of the light receiving sides, and at the same time, are incident on the end faces of the respective cores 8 which are aligned along the X-side of the light receiving sides. In this state, the beams guided through the respective cores 8 are received by the respective right receiving elements in the light receiving element group 9, and each of the light receiving elements is in an on-state.

In this state, a scan of the respective light receiving elements in the light receiving element group 9 is performed in a scan time of not more than 1 ms.

Here will be explained a scan operation. First, there is determined whether a light shielding signal is detected at any of the light receiving elements corresponding to the respective cores 8, in a sequential way through the cores 8 aligned along the Y-side of the light receiving sides, from the uppermost core 8 to the lower cores 8 in FIG. 4. Then, upon detecting a light shielding signal through a light receiving element corresponding to a core 8, with reference to the light receiving element, there starts to be determined whether a light shielding signal is detected at any of the light receiving elements corresponding to the respective cores 8 in a sequential way through the cores 8 aligned along the X-side of the light receiving sides in FIG. 4, from the leftmost core 8 to the right side cores 8.

There, to begin with, the point C is touched at time t=t1 during a scan time at a first scan timing. In this state, a light shielding signal SY1 is detected at a light receiving element corresponding to the seventh core 8 from the top of the cores 8 on the Y-side of the light receiving sides. That is, if the coordinates of the point C in the operational area 5 are (x2, y1), the light shielding signal SY1 is detected at y=y1.

Then, with reference to the light receiving element corresponding to the seventh core 8 from the top of the cores 8 on the Y-side of the light receiving sides, a scan is performed through the light receiving elements corresponding to the respective cores 8 on the X-side of the light receiving sides. There, a light shielding signal SX2 is detected at a light receiving element corresponding to the seventh core 8 from the left. That is, the light shielding signal SX2 is detected at x=x2, which is the X-coordinate of the point C.

Based on the light shielding signals SY1 and SX2 thus detected, it is recognized that the operational area 5 is touched on the point C (x2, y1). According to this, a flag is turned on in a flag region of the flag memory corresponding to the point C, and the flag region is turned to a flag-on state.

Secondly, while the touch on the point C is maintained, a touch is started on the point D, at time t=t2 during a scan time of a second scan timing. In this state, a light shielding signal SY2 starts to be detected at a light receiving element corresponding to the third core 8 from the top of the cores 8 on the Y-side of the light receiving sides. That is, if the coordinates of the point D in the operational area 5 are (x1, y2), the light shielding signal SY2 starts to be detected at y=y2.

Then, with reference to the light receiving element corresponding to the third core 8 from the top of the cores 8 on the Y-side of the light receiving sides, a scan is performed through the light receiving elements corresponding to the respective cores 8 on the X-side of the light receiving sides. There, a light shielding signal SX1 starts to be detected at a light receiving element corresponding to the third core 8 from the left. That is, the light shielding signal SX1 starts to be detected at x=x1, which is the X-coordinate of the point D.

Then, while the touch on the point C is maintained, the touch on the point D is completed, at time t=t3 during a scan time of a third scan timing.

In this state, the light shielding signal SY2 is completely detected at y=y2, and the light shielding signal SX1 is completely detected at x=x1.

Based on the light shielding signals SY2 and SX1 thus detected, it is recognized that the operational area 5 is touched on the point D (x1, y2). According to this, a flag is turned on in a flag region of the flag memory corresponding to the point D, and the flag region is turned to a flag-on state.

Here, as above mentioned, with respect to the point C, the flag region corresponding to the point C has been turned to the flag-on state through recognizing the touch on the point C at the scan timing of time t=t1. According to this, when recognizing the touch on the point D at the scan timing of time t=t3, it can be detected that the point C has been touched at a scan timing before time t=t3 by confirming that the flag region corresponding to the point C is in the flag-on state.

Here, as is clear by comparison of FIG. 3 and FIG. 4, the light shielding signals SX1, SX2, SY1 and SY2 obtained at time t=t3 are identical in the case of FIG. 3 and in the case of FIG. 4. However, the control unit 7 controls a scan time for the light receiving elements in the light receiving element group 9 to be not more than 1 ms so that the scan time is shorter than the time lag which occurs between two touches when an ordinary operator touches two points with an intension of touching the two points simultaneously. Thus, it becomes possible to accurately detect the order and positions of the touches with respect to the points A and B and also the points C and D.

In addition, as a touch history of each touch position is confirmed by detecting the on/off state in each of the flag regions of the flag memory at every scan timing, it becomes possible to accurately detect the order and positions of the touches with respect to the points A and B and also the points C and D, combined with the effect of the scan time.

As has been described in detail, in the coordinate input apparatus 1 directed to the present embodiment, beams from one light emitting element 6 are guided simultaneously through the plurality of cores 4 provided at the waveguide 2 to respective edges on Y-side and X-side of the light emitting sides of the operational area 5. The presence or absence of a light shielding signal is detected therein by sequentially scanning the light receiving elements in the light receiving element group 9 corresponding to the respective cores 8 aligned on the Y-side of the light receiving sides and the light receiving elements in the light receiving element group 9 corresponding to the respective cores 8 aligned on the X-side of the light receiving sides. A scan time for the above scanning of the light receiving elements in the light receiving element group 9 is set to be not more than 1 ms. Accordingly, it becomes possible to scan the light receiving elements in the light receiving element group 9 within a time period shorter than the time lag which occurs between two touches when an ordinary operator touches two points with an intention of touching the two points simultaneously. Therefore, the order and the positions of the touches on the two points can be accurately detected even if the operational area 5 is touched on two positions approximately simultaneously.

In a case where a scan time of the light receiving elements is set to not more than 0.2 ms, the scan time is at least five times as short as the time lag which occurs between two touches when the ordinary operator touches two points with the intention of touching the two points simultaneously. Therefore the order and the positions of the touches on the two points can be further accurately detected even if the operational area 5 is touched on two positions approximately simultaneously.

Further, when scanning the light receiving elements in the light receiving element group 9, the control unit 7 is configured to firstly scan the cores 8 aligned along the Y-side of the light receiving sides sequentially from the uppermost core 8 to lower cores 8 so as to determine whether a light shielding signal is detected at a light receiving element corresponding to a core 8. Then, when a light shielding signal is detected through a light receiving element corresponding to a core 8, with reference to the light shielding signal thus detected, the control unit 7 starts scanning so as to determine whether or not a light shielding signal is detected at a light receiving element corresponding to a core 8 through the cores 8 aligned along the X-side of the light receiving sides sequentially from the leftmost core 8 to rightward cores 8. Therefore, in the control unit 7, a useless scan operation can be obviated during a time before a detection of a light shielding signal. It becomes thus possible to quicken a scan speed for scanning the light receiving elements by the control unit 7.

In addition, in the coordinate input apparatus 1 directed to the present embodiment, beams emitted from one light emitting element 6 are simultaneously guided through a plurality of cores 4 provided at a waveguide 2 to the edges on X-side and Y-side of light emitting sides of the operational area 5. Therefore, a plurality of light emitting devices can be achieved by using one light emitting element 6, and accordingly, the cost of the coordinate input apparatus 1 can be reduced, with respect to a light emitting element.

While the presently preferred embodiment of the present invention has been shown and described, it is to be understood that this disclosure is for the purpose of illustration and that various changes and modifications may be made without departing from the spirit and scope of the invention as set forth in the appended claims.

The coordinate input apparatus directed to the present invention can provide an optical coordinate input apparatus wherein, while a plurality of light emitting devices are illuminated simultaneously, a plurality of light receiving devices are sequentially scanned, wherein a scan time is set to be not more than 1 ms for scanning the plurality of light receiving devices so as to detect presence or absence of a light shielding signal, and wherein an accurate detection can be achieved with respect to the order and positions of touches on two points even in a case where an operational area is touched on the two points approximately simultaneously.

What is claimed is:

1. An optical coordinate input apparatus comprising:
    a light emitting part including:
        a plurality of first light emitting devices arranged along a first side defining a part of a rectangular operational area on a display device; and
        a plurality of second light emitting devices arranged along a second side perpendicular to the first side;
    a light receiving part including:
        a plurality of first light receiving devices for receiving light emitted from each of the first light emitting devices, each of the first light receiving devices being arranged so as to be opposed to each of the first light emitting devices and arranged along a third side opposed to the first side; and
        a plurality of second light receiving devices for receiving light emitted from each of the second light emitting devices, each of the second light receiving devices being arranged so as to be opposed to each of the second light emitting devices and arranged along a fourth side opposed to the second side;
    wherein when light shielding signals are detected by a first light receiving device and a second light receiving device, the optical coordinate input apparatus judges that the display device is touched in the rectangular operational area at an intersection point where light emitted from a first light emitting device corresponding to the first light receiving device and light emitted from a second light emitting device corresponding to the second light receiving device mutually intersect,
    the optical coordinate input apparatus further comprising:
        a light emitting control device for controlling both the first light emitting devices and the second light emitting devices so as to emit light at the same time; and
        a detection control device for detecting the light shielding signal by sequentially scanning each of the first light receiving devices and the second light receiving devices;
    wherein a scanning time to scan all of the first light receiving devices and the second light receiving devices by the detection control device is set not more than 1 ms.

2. The optical coordinate input apparatus according to claim 1, wherein the scanning time is set not more than 0.2 ms.

3. The optical coordinate input apparatus according to claim 1, wherein the detection control device sequentially scans the first light receiving devices and start to scan the second light receiving devices when the light shielding signal is detected through a first light receiving device.

4. The optical coordinate input apparatus according to claim 1, wherein the light emitting part comprises:
    one light emitting element; and
    a first light waveguide including a plurality of light guide members arranged so that one set of ends of the light guide members are converged near the light emitting element, a part of other set of ends of the light guide members being arranged along the first side and remaining part of other set of ends of the light guide members being arranged along the second side.

5. The optical coordinate input apparatus according to claim 1, wherein the light receiving part comprises:
    a second light waveguide including a plurality of light guide members, a part of one ends of the light guide members being arranged along the third side and remaining part of one set of ends of the light guide members being arranged along the fourth side and other set of ends of the light guide members being converged and connected to the detection control device.

* * * * *